United States Patent
L'Arrivée et al.

(10) Patent No.: US 10,794,268 B2
(45) Date of Patent: Oct. 6, 2020

(54) POWERING A SUPERCHARGER FOR A HYBRID ELECTRIC POWERTRAIN

(71) Applicant: FORD GLOBAL TECHNOLOGIES, LLC, Dearborn, MI (US)

(72) Inventors: Courtney L'Arrivée, Melvindale, MI (US); Stephen Powell, Troy, MI (US); Anthony Boyko, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/103,112

(22) Filed: Aug. 14, 2018

(65) Prior Publication Data
US 2020/0056534 A1   Feb. 20, 2020

(51) Int. Cl.
*F02B 39/04* (2006.01)
*B60K 6/48* (2007.10)
*B60K 6/38* (2007.10)
*F02B 39/12* (2006.01)

(52) U.S. Cl.
CPC ............ *F02B 39/04* (2013.01); *B60K 6/38* (2013.01); *B60K 6/48* (2013.01); *F02B 39/12* (2013.01)

(58) Field of Classification Search
CPC .......... F02B 39/04; F02B 39/06; F02B 39/10; F02B 39/12; B60K 6/24; B60K 6/38; B60K 6/383; B60K 6/387; B60K 6/40; B60K 6/48; F02D 23/005; B60W 10/08; B60W 10/06
USPC .................. 123/559.1, 559.3, 565, 562, 528; 180/65.25, 65.265, 65.28, 65.285
See application file for complete search history.

(56) References Cited

U.S. PATENT DOCUMENTS

| 4,530,338 | A | * | 7/1985 | Sumi | F02B 39/12 123/198 R |
| 4,730,457 | A | * | 3/1988 | Yamada | F02B 37/04 60/609 |
| 5,881,559 | A | * | 3/1999 | Kawamura | B60K 6/24 60/597 |
| 5,890,468 | A | * | 4/1999 | Ozawa | F02B 37/005 123/561 |
| 5,937,831 | A | * | 8/1999 | Volkmann | F02B 33/446 123/559.3 |
| 6,338,391 | B1 | | 1/2002 | Severinsky et al. | |
| 6,478,100 | B1 | * | 11/2002 | Grewe | B60K 6/24 180/65.245 |
| 6,651,433 | B1 | * | 11/2003 | George, Jr. | B63G 8/12 60/614 |
| 8,245,802 | B2 | * | 8/2012 | Inoue | B60K 6/485 180/65.28 |

(Continued)

FOREIGN PATENT DOCUMENTS

JP   2006037876 A * 2/2006

*Primary Examiner* — Mark A Laurenzi
*Assistant Examiner* — Mickey H France
(74) *Attorney, Agent, or Firm* — David B. Kelley; MacMillan, Sobanski & Todd, LLC (57) ABSTRACT

A vehicle has an internal combustion engine, a motor configured to propel the vehicle, and a supercharger. A mechanical connection is configured to transfer torque from at least one of the engine and machine to the supercharger. The supercharger is a single torque load on the mechanical connection. The vehicle further has a first clutch between the motor and engine and a second clutch between the motor and supercharger.

8 Claims, 5 Drawing Sheets

(56) References Cited

U.S. PATENT DOCUMENTS

| | | | | |
|---|---|---|---|---|
| 8,739,751 B2* | 6/2014 | Stoffels | | F02D 23/00 |
| | | | | 123/179.4 |
| 9,789,756 B2 | 10/2017 | Schwartz et al. | | |
| 9,827,974 B1* | 11/2017 | Boyko | | F02N 11/0844 |
| 2004/0237949 A1* | 12/2004 | Yasui | | F04D 25/024 |
| | | | | 123/559.1 |
| 2006/0174624 A1* | 8/2006 | Grabowski | | B60K 6/40 |
| | | | | 60/709 |
| 2007/0149336 A1* | 6/2007 | Sallstrom | | F02B 39/10 |
| | | | | 475/5 |
| 2008/0173017 A1* | 7/2008 | St. James | | F02B 33/446 |
| | | | | 60/608 |
| 2009/0019852 A1* | 1/2009 | Inoue | | F02B 33/40 |
| | | | | 60/608 |
| 2009/0025696 A1* | 1/2009 | Lovgren | | F02B 39/06 |
| | | | | 123/559.1 |
| 2009/0048745 A1* | 2/2009 | Wu | | B60W 20/00 |
| | | | | 701/51 |
| 2010/0155157 A1* | 6/2010 | Grieve | | B60K 6/365 |
| | | | | 180/65.6 |
| 2010/0314186 A1* | 12/2010 | Ma | | F02B 33/44 |
| | | | | 180/165 |
| 2012/0035815 A1* | 2/2012 | Kawashima | | H02P 9/04 |
| | | | | 701/50 |
| 2012/0269653 A1* | 10/2012 | Lutoslawski | | F02M 37/041 |
| | | | | 417/44.1 |
| 2013/0152581 A1* | 6/2013 | Lofgren | | F02B 37/105 |
| | | | | 60/605.1 |
| 2013/0174544 A1* | 7/2013 | Valetutti | | B60K 6/24 |
| | | | | 60/598 |
| 2013/0298881 A1* | 11/2013 | Ai | | F04D 25/028 |
| | | | | 123/565 |
| 2014/0090373 A1* | 4/2014 | Timmons | | F02B 39/12 |
| | | | | 60/605.1 |
| 2014/0208745 A1* | 7/2014 | Suhocki | | F02D 41/0007 |
| | | | | 60/611 |
| 2014/0224228 A1* | 8/2014 | Benjey | | B60K 6/485 |
| | | | | 123/559.3 |
| 2014/0238361 A1* | 8/2014 | Tsourapas | | F02B 33/36 |
| | | | | 123/562 |
| 2015/0088349 A1* | 3/2015 | Akashi | | B60W 10/08 |
| | | | | 701/22 |
| 2015/0183421 A1* | 7/2015 | Baliff | | F02B 39/10 |
| | | | | 701/22 |
| 2015/0219030 A1* | 8/2015 | Naik | | F02M 26/08 |
| | | | | 60/599 |
| 2015/0246715 A1* | 9/2015 | Buzzi | | B63B 1/18 |
| | | | | 440/1 |
| 2015/0361905 A1* | 12/2015 | Lofgren | | B60W 20/14 |
| | | | | 417/34 |
| 2015/0377158 A1* | 12/2015 | Benjey | | B60W 20/13 |
| | | | | 701/22 |
| 2016/0001649 A1* | 1/2016 | Benjey | | B60K 6/387 |
| | | | | 477/5 |
| 2016/0047298 A1* | 2/2016 | Lofgren | | F02B 39/12 |
| | | | | 60/273 |
| 2016/0160749 A1* | 6/2016 | Schnorbus | | F02B 39/04 |
| | | | | 123/559.3 |
| 2017/0008512 A1* | 1/2017 | Yukawa | | B60K 6/48 |
| 2017/0276103 A1* | 9/2017 | Yamamoto | | F02D 41/04 |
| 2017/0320498 A1* | 11/2017 | Miller | | B60W 10/101 |
| 2018/0022339 A1* | 1/2018 | Leone | | F02M 25/03 |
| | | | | 701/22 |
| 2018/0045103 A1* | 2/2018 | McClellan | | F02D 23/00 |
| 2018/0215246 A1* | 8/2018 | Franke | | F02B 63/04 |
| 2018/0371933 A1* | 12/2018 | Tsourapas | | F02B 39/10 |
| 2019/0256077 A1* | 8/2019 | Stoltz | | B60K 6/28 |

* cited by examiner

FIG. 1

| Case | First Clutch 118 State | Second Clutch 134 State | Supercharger 106 State | Source of propulsive torque for vehicle 102 |
|---|---|---|---|---|
| 1 | Open | Open | Unpowered | Motor 112 only |
| 2A | Closed | Closed | Powered | Engine 108 and motor 112 |
| 2B | Closed | Closed | Powered | Engine 108 (motor 112 operates as generator) |
| 2C | Closed | Closed | Powered | Engine 108 (motor 112 not operated) |
| 3A | Closed | Open | Unpowered | Engine 108 and motor 112 |
| 3B | Closed | Open | Unpowered | Engine 108 (motor 112 operates as generator) |
| 3C | Closed | Open | Unpowered | Engine 108 (motor 112 not operated) |
| 4 | Open | Closed | Powered | Motor 112 only |
| 5 | Open | Open | Unpowered | Vehicle 102 braking (motor 112 operating as generator) |
| 6 | Closed | Open | Unpowered | Vehicle 102 braking (motor 112 operating as generator) |

POWERING A SUPERCHARGER FOR A HYBRID ELECTRIC POWERTRAIN

BACKGROUND OF INVENTION

The present invention relates to powering accessory devices for a hybrid electric powertrain without a front end accessory drive (FEAD) and in particular to powering a forced induction device (supercharger) for a hybrid electric powertrain without a front end accessory drive.

An automotive vehicle with an internal combustion engine is typically provided with an FEAD to power accessory devices for the vehicle. Such accessory devices commonly include a water pump, power steering pump, an air conditioning compressor, alternator, and/or a forced induction device such as a supercharger. The FEAD is well known in the art and typically includes a belt powering two or more of the accessory devices from an output shaft of the engine as well as other components such as pulleys and tensioners for the belt.

Compared to a conventional vehicle powertrain, a hybrid electric powertrain has additional equipment such as a traction motor and high voltage battery. Packaging of the additional equipment may be improved by omitting the FEAD. When the FEAD is omitted, the accessory devices may be electrically powered rather than mechanically powered by the FEAD. For example, a water pump, power steering pump, and air conditioning compressor may each be powered by 12 V electric motors. These motors are typically limited to 12 V or less because a normal electrical system of the vehicle for accessories is constrained by a standard 12 V car battery.

SUMMARY OF INVENTION

An embodiment contemplates a vehicle having an internal combustion engine, a motor configured to propel the vehicle, and a supercharger. A mechanical connection is configured to transfer torque from at least one of the engine and machine to the supercharger. The supercharger is a single torque load on the mechanical connection. A first clutch is between the machine and engine and a second clutch is between the machine and supercharger.

Another embodiment contemplates a hybrid vehicle having an internal combustion engine configured to rotate driven wheels of the vehicle and an electric traction motor on a common shaft with the engine and configured to also rotate the driven wheels. The common shaft is powered by at least one of the engine and motor. A supercharger is configured to provide forced induction to the engine. A mechanical connection is configured to transfer torque from the common shaft to the supercharger. The supercharger is a single torque load on the mechanical connection. A first clutch is between the engine and motor and a second clutch is between the motor and supercharger.

Another embodiment contemplates a vehicle having an internal combustion engine, an electric traction motor, a mechanical connection configured to transfer torque from a shaft between the engine and motor, and a supercharger for the engine. The supercharger is an only torque load on the mechanical connection. A first clutch is in the shaft between the engine and motor and a second clutch is between the mechanical connection and the supercharger.

An advantage of an embodiment is powering a supercharger for a hybrid electric powertrain while omitting a front end accessory drive (FEAD). An additional advantage is that the supercharger may be packaged in a location where there is cooler air at an inlet of the supercharger. Another advantage is use of an internal combustion engine with smaller displacement for a hybrid electric powertrain when turbocharging is not practical. The supercharger may be driven by a high voltage electric motor, thus providing the power needed to operate the supercharger.

DETAILED DESCRIPTION

Figure 1:
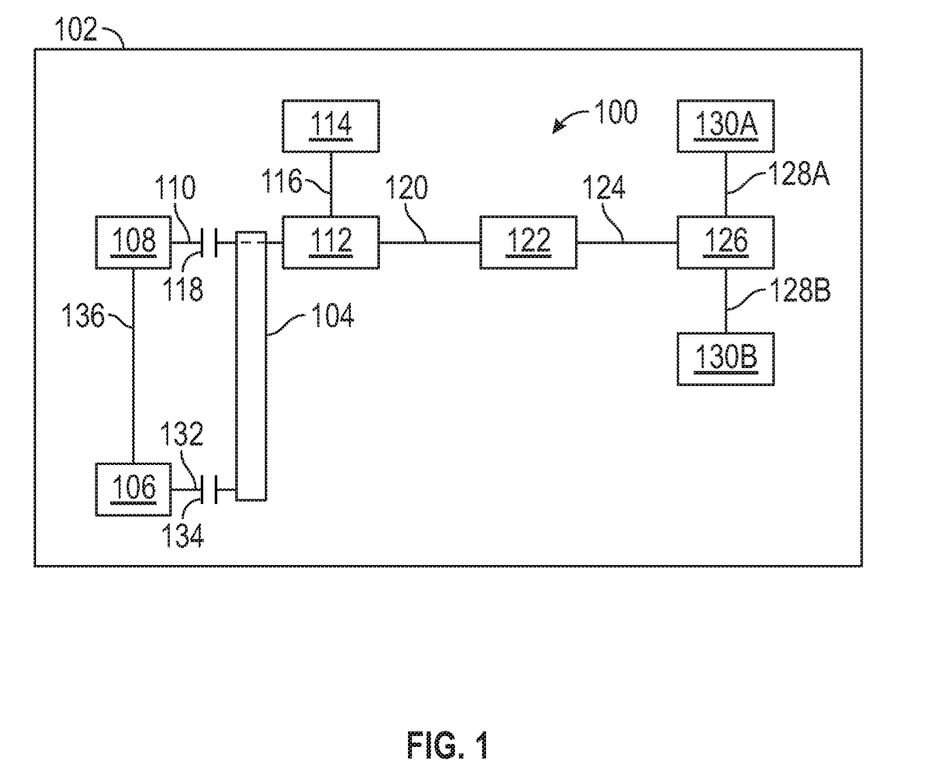
FIG. 1 is a schematic view of a hybrid electric powertrain without a front end accessory drive (FEAD) and having a mechanically driven supercharger.

Referring now to FIG. 1, there is illustrated a hybrid electric powertrain, indicated generally at 100, for an automotive vehicle 102. The powertrain 100 includes a mechanical connection 104 for a supercharger 106. The powertrain 100 does not have, and is not otherwise provided or operated with, a front end accessory drive (FEAD). Thus, the supercharger 106 is mechanically driven despite the powertrain 100 not having an FEAD.

The mechanical connection 104 is not limited to use with the specific powertrain 100 illustrated. The powertrain 100 is merely exemplary and may take other forms or configurations. As non-limiting examples, the powertrain 100 may be configured for front wheel drive (FWD), rear wheel drive (RWD), all-wheel drive (AWD), or other applications. As illustrated and described herein, the powertrain 100 is a parallel type of hybrid electric powertrain. Alternatively, as non-limiting examples, the mechanical connection 104 may be used with powersplit or other types of hybrid electric powertrains. The mechanical connection 104 will be further discussed in detail.

The powertrain 100 further includes an internal combustion engine (ICE) 108 for producing engine torque ($\tau_E$) to propel the vehicle 102. As used herein, including in the claims, the term engine means an internal combustion engine without a front end accessory drive. The engine 108 is rotationally connected by a common first shaft 110 to an electric machine (motor) 112 that may be operated as a motor to produce positive motor torque ($\tau_M$). As used herein, including in the claims, the term motor means an electric machine that can provide torque to drive vehicle wheels (sometimes referred to as a traction motor) using high voltage, and which may be able to operate as a generator as well. As used herein, including in the claims, high voltage means at least 45 V, preferably about 48 V, but may also include voltages as high as about 300 V.

The motor 112 may be powered by a high voltage battery 114 through an electrical circuit 116. When operated to propel the vehicle 102, the motor 112 produces a positive value for the motor torque ($\tau_M$). Alternatively, the engine 108 may also power—i.e., rotate—the motor 112 as a generator to charge the battery 114 through the circuit 116. When operated as the generator, the motor 112 produces a negative value for the motor torque ($\tau_M$).

Furthermore, the mechanical connection 104 is connected to the first shaft 110 (shown by hidden lines) to receive a supercharger torque ($\tau_S$) from the first shaft 110. The supercharger torque powers the supercharger 106. The term supercharger as used herein, including in the claims, is a forced air induction device mechanically driven by the motor 112 and/or engine 108, but does not include a turbocharger as such devices are driven by exhaust gases. Thus, the supercharger torque is a torque load or other negative torque that is subtracted from a sum of the engine torque and the motor torque. The first shaft 110 has a propulsive torque ($\tau_{Pro}$) for propelling the vehicle 102. Without considering other vehicle accessories, friction, or other loses, the propulsive torque ($\tau_{Pro}$) is equal to a sum of the engine torque ($\tau_E$), motor torque ($\tau_M$), and supercharger torque ($\tau_S$). The propulsive torque ($\tau_{Pro}$) may be ideally expressed as:

$$\tau_E + \tau_M + \tau_S = \tau_{Pro} \quad (1)$$

The first shaft 110 also includes a first or engine clutch 118 between the engine 108 and the motor 112. More specifically, the first clutch 118 is positioned on the first shaft 110 between the engine 108 and the mechanical connection 104. The first clutch 118 is a typical clutch that selectively connects and disconnects the engine 108 and the motor 112 for transferring the engine and motor torques there between via rotation of the common first shaft 110.

The motor 112 is rotationally connected by a second shaft 120 to a transmission 122 for transferring the propulsive torque there between via rotation of the second shaft 120. The transmission 122 may include a torque converter (not separately shown).

The transmission 122, in turn, is rotationally connected by a third shaft 124 to a differential 126 for transferring the propulsive torque there between via rotation of the third shaft 124. Rotation of a first half shaft 128A transfers a portion of the propulsive torque between the differential 126 and a first driven wheel 130A so as to rotate the first driven wheel 130A. Similarly, rotation of a second half shaft 128B transfers a portion of the propulsive torque between the differential 126 and a second driven wheel 1306 so as to rotate the second driven wheel 1306. Thus, through the first, second, and third shafts 110, 120, and 124, respectively, and the first and second half shafts 128A and 128B, respectively, the propulsive torque produced by the engine 108 and/or the motor 112 may mechanically rotate the first and second driven wheels 130A and 130B, respectively, and propel the vehicle 102. The second shaft 120, third shaft 124, and first and second half shafts 128A and 128B, respectively, may be rotated or otherwise powered by either the engine 108, the motor 112, or both the engine 108 and the motor 112 in combination.

The mechanical connection 104 will now be discussed in detail. As non-limiting examples, the mechanical connection 104 may be a belt, gearing, shaft, or other mechanical structure for transferring the supercharger torque. As discussed, the mechanical connection 104 is connected to the first shaft 110 to receive the supercharger torque from the first shaft 110. The mechanical connection 104 then transfers the supercharger torque to a fourth shaft 132, wherein the fourth shaft 132 rotationally drives or otherwise powers the supercharger 106. The supercharger 106 is a single or otherwise only torque load on the fourth shaft 132—i.e., no other devices are turned by the fourth shaft 132.

The fourth shaft 132 includes a second or accessory clutch 134. The second clutch 134 is a typical clutch that selectively connects and disconnects the mechanical connection 104 and the supercharger 106 for transferring the supercharger torque from the mechanical connection 104 to the supercharger 106. The second clutch 134 is between the motor 112 and the supercharger 106. More specifically, the second clutch 134 is between the mechanical connection 104 and the supercharger 106.

As discussed, the first shaft 110 is a source of the supercharger torque from the engine 108 and/or the motor 112 to the mechanical connection 104 and the supercharger 106 is a torque load or recipient for the supercharger torque from the mechanical connection 104 through the fourth shaft 132. More specifically, the first shaft 110 is a single or otherwise only source of torque to the mechanical connection 104 and the supercharger 106 is a single or otherwise only torque load or recipient for the supercharger torque from the mechanical connection 104. Thus, the mechanical connection 104 transfers the supercharger torque only from the first shaft 110 and only to the fourth shaft 132.

As illustrated, the supercharger 106 is a forced induction device. When operated, the forced induction device compresses, or otherwise forces, increased air mass per volume into an air intake 136 of the engine 108.

Figure 2:
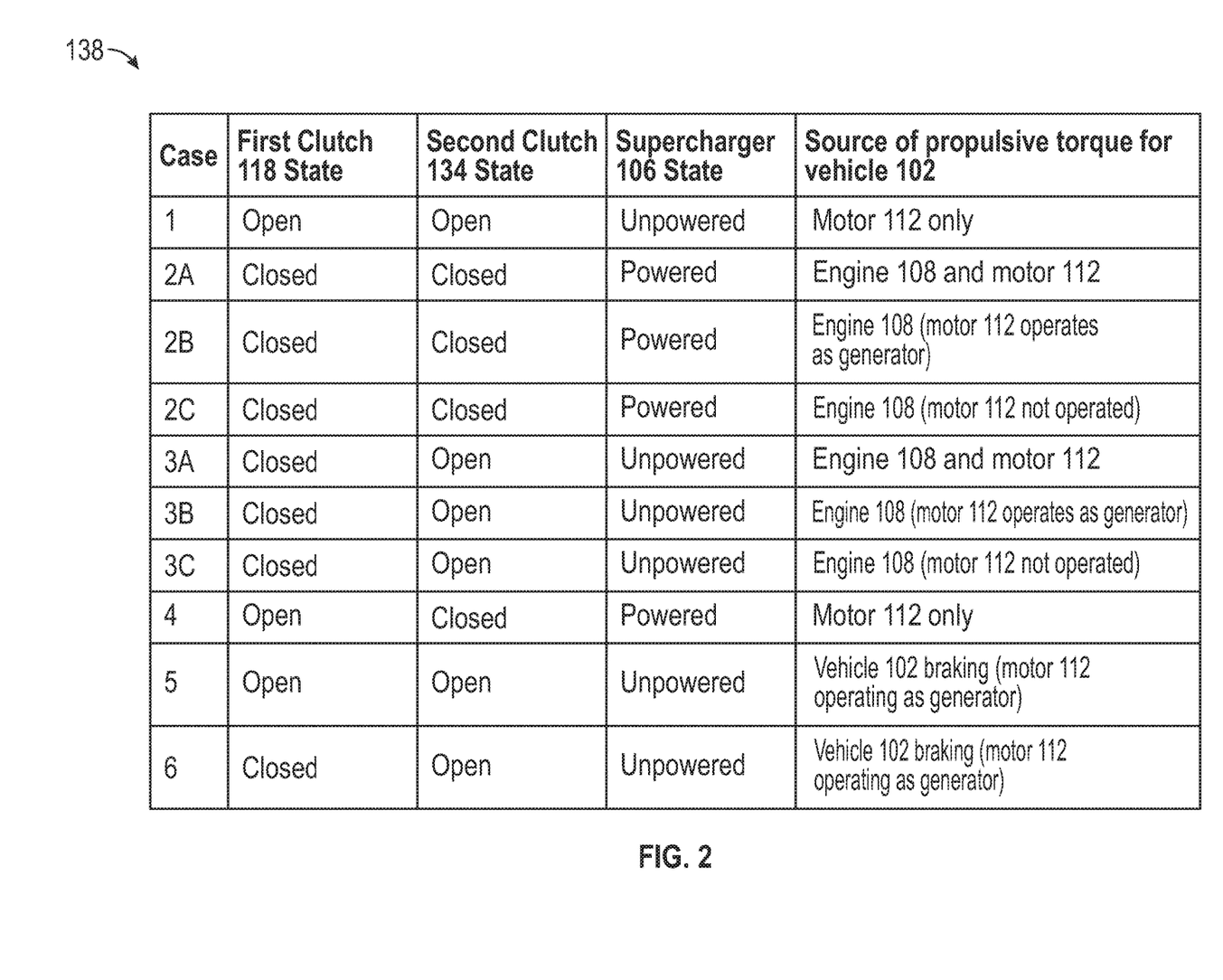
FIG. 2 is a table of operating states for the hybrid electric powertrain of FIG. 1.

Referring now to FIG. 2, there is illustrated a table, indicated generally at 138, showing non-limiting example operating cases of the powertrain 100 with the supercharger 106. The operating cases for the powertrain 100 are not limited by the specific operating cases listed in the table 138.

For an operating case 1, both the first and second clutches 118 and 134, respectively, are open. The engine 108 is disconnected from rotating the first and second driven wheels 130A and 130B, respectively, and the supercharger 106 is not powered—i.e., the supercharger is not providing forced induction to the engine 108. For the operating case 1, only the motor 112 rotates the first and second driven wheels 130A and 130B, respectively, to propel the vehicle 102. Typically, for the operating case 1, the engine 108 and the supercharger 106 are turned off or otherwise not running.

For operating cases 2A, 2B, and 2C, both the first and second clutches 118 and 134, respectively, are closed. For all of the operating cases 2A, 2B, and 2C, the engine 108 is rotating the first and second driven wheels 130A and 130B, respectively, to propel the vehicle 102 and the supercharger 106 is powered—i.e., the supercharger is providing forced induction to the engine 108.

For the operating case 2A specifically, the motor 112 is operated to produce the positive value for the motor torque. This results in both the engine 108 and the motor 112 rotating the first and second driven wheels 130A and 130B, respectively, to propel the vehicle 102 and powering the supercharger 106.

For the operating case 2B specifically, the motor 112 is operated as the generator to produce the negative value for the motor torque. This results in only the engine 108 rotating the first and second driven wheels 130A and 130B, respectively, to propel the vehicle 102.

For the operating case 2C specifically, the motor 112 is not operated and the motor torque has a zero value. For the operating case 2C, the engine 108 is again only rotating the first and second driven wheels 130A and 130B, respectively, to propel the vehicle 102.

For operating cases 3A, 3B, and 3C, the first clutch 118 is closed and the second clutch 134 is open. For all of the operating cases 3A, 3B, and 3C, the engine 108 is rotating the first and second driven wheels 130A and 130B, respectively, to propel the vehicle 102 and the supercharger 106 is unpowered—i.e., the supercharger is not providing forced induction to the engine 108.

For the operating case 3A specifically, the motor 112 is operated as the motor to produce the positive value for the motor torque. This results in both the engine 108 and the motor 112 rotating the first and second driven wheels 130A and 130B, respectively, to propel the vehicle 102.

For the operating case 3B specifically, the motor 112 is operated as the generator to produce the negative value for the motor torque. This results in only the engine 108 rotating the first and second driven wheels 130A and 130B, respectively, to propel the vehicle 102.

For the operating case 3C specifically, the motor 112 is not operated and the motor torque has a zero value. For the operating case 3C, the engine 108 is again only rotating the first and second driven wheels 130A and 130B, respectively, to propel the vehicle 102.

For an operating case 4, the first clutch 118 is open and the second clutch 134 is closed. The engine 108 is disconnected from rotating the first and second driven wheels 130A and 130B, respectively, and the supercharger 106 is powered from the motor 112 only. For the operating case 4, the motor 112 only is rotating the driven wheels 130A and 130B, respectively, to propel the vehicle 102. Furthermore, for the operating case 4, the supercharger 106 may be powered by only the motor 112 before the engine 108 is started or the motor 112 may be used to power the supercharger 106 to start the engine 108 using positive intake pressure (using the supercharger 106). For the operating case 4, the engine 108 is not powering the supercharger 106.

For operating cases 5 and 6, the vehicle 102 is slowing—e.g., braking—and the motor 112 is operating as a generator to charge the battery 114—i.e., the powertrain 100 is operating in a regenerative mode. In the operating case 5, both the first and second clutches 118 and 134, respectively, are open. Rotation of the first and second driven wheels 130A and 130B, respectively, is rotating the motor 112 through the second and third shafts 120 and 124, respectively, and the first and second half shafts 128A and 128B. In the operating case 6, the first clutch 118 is closed and the second clutch 134 is open. Both the first and second driven wheels 130A and 130B, respectively (through the second and third shafts 120 and 124, respectively, and the first and second half shafts 128A and 128B) and the engine 108 (through the first shaft 110) are rotating the motor 112 as a generator.

Figure 3:
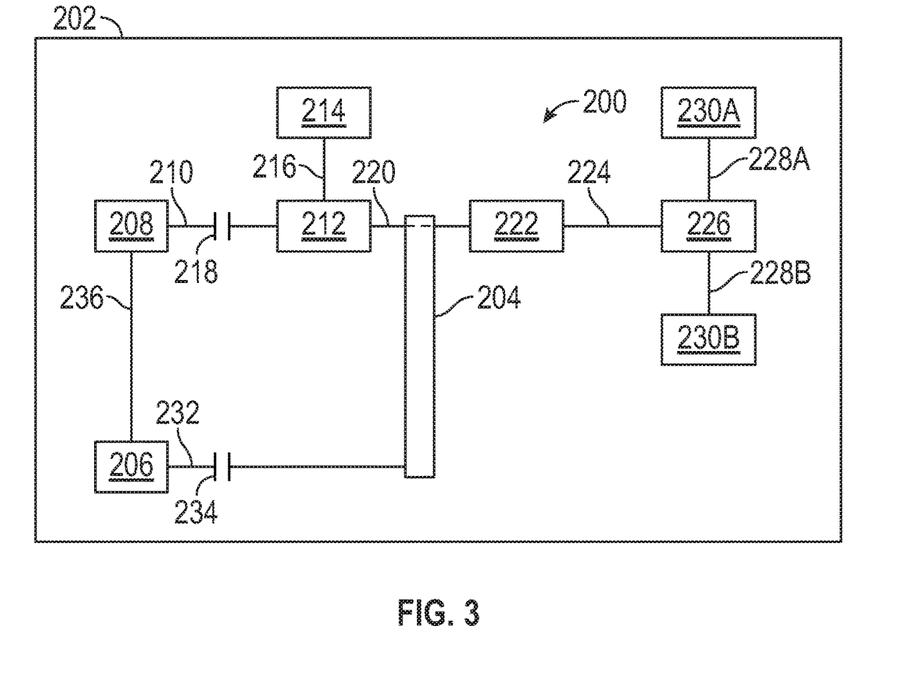
FIG. 3 is a second hybrid electric powertrain without a FEAD and having the mechanically driven supercharger.

Referring now to FIG. 3, there is schematically illustrated a second hybrid electric powertrain, indicated generally at 200, having a mechanical connection 204. Because the powertrain 200 and the mechanical connection 204 are variations of the powertrain 100 and mechanical connection 104 of FIGS. 1 and 2, like reference numerals, increased by 100, designate corresponding parts in the drawings and detailed description thereof will be omitted.

A mechanical connection 204 is connected (shown by hidden lines) to a second shaft 220. As a result, the mechanical connection 204 receives a supercharger torque from the second shaft 220 between a motor 212 and a transmission 222.

Figure 4:
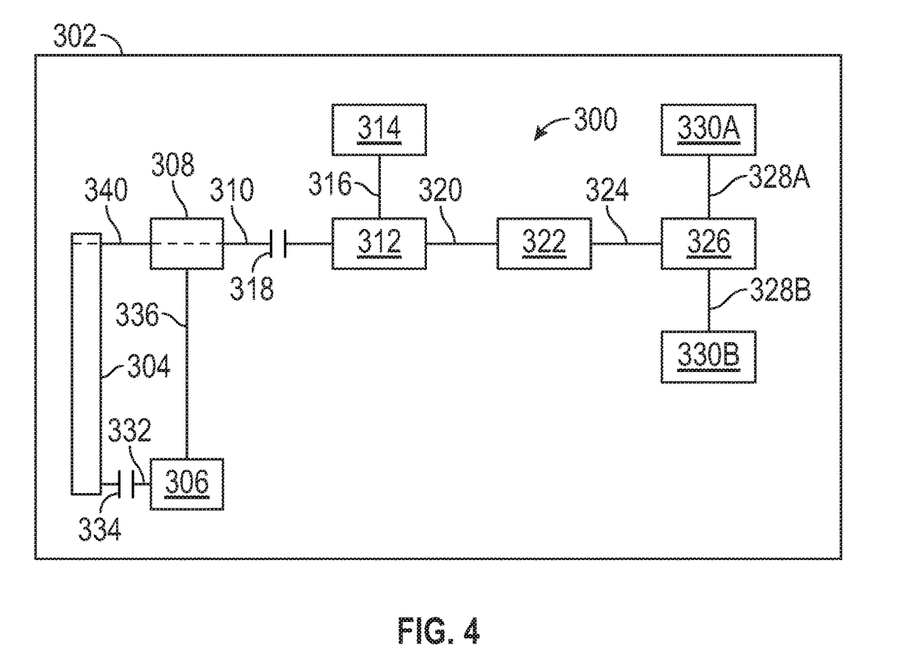
FIG. 4 is a third hybrid electric powertrain without a FEAD and having the mechanically driven supercharger.

Referring now to FIG. 4, there is schematically illustrated a third hybrid electric powertrain, indicated generally at 300, having a mechanical connection 304. Because the powertrain 300 and the mechanical connection 304 are variations of the powertrain 100 and mechanical connection 104 of FIGS. 1 and 2, like reference numerals, increased by 200, designate corresponding parts in the drawings and detailed description thereof will be omitted.

A mechanical connection 304 is connected to a shaft extension 340 (shown by hidden lines) of a first shaft 310. The shaft extension 340 extends from an engine 308 on a side opposite a motor 312 and (as shown by hidden lines in the engine 308) is a continuation or other extension of the first shaft 310.

Figure 5:
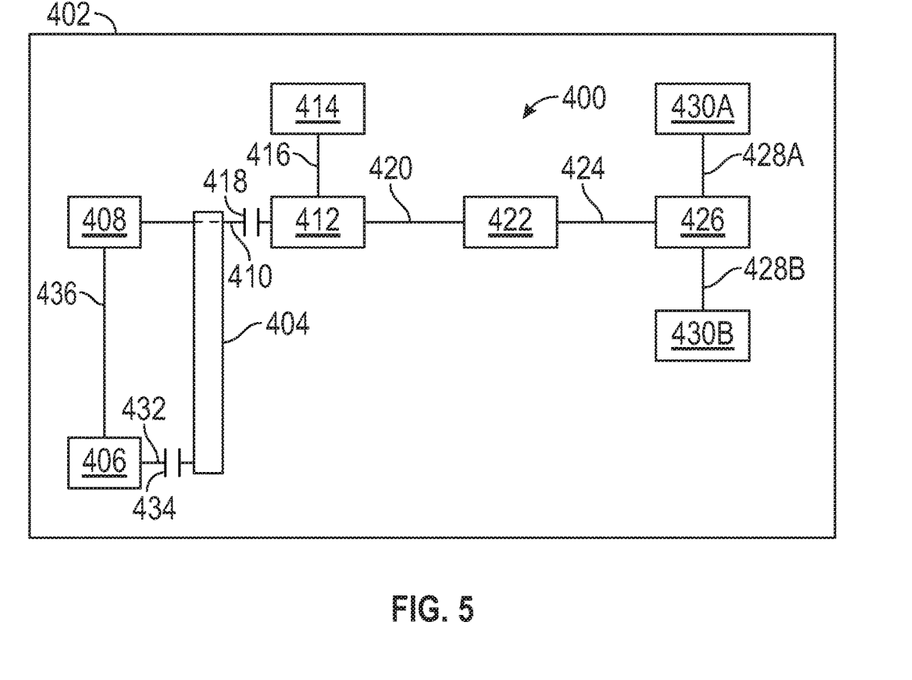
FIG. 5 is a fourth hybrid electric powertrain without a FEAD and having the mechanically driven supercharger.

Referring now to FIG. 5, there is schematically illustrated a fourth hybrid electric powertrain, indicated generally at 400, having a mechanical connection 404. Because the powertrain 400 and the mechanical connection 404 are variations of the powertrain 100 and mechanical connection 104 of FIGS. 1 and 2, like reference numerals, increased by 300, designate corresponding parts in the drawings and detailed description thereof will be omitted.

A first clutch 418 is positioned between a motor 412 and the mechanical connection 404.

Figure 6:
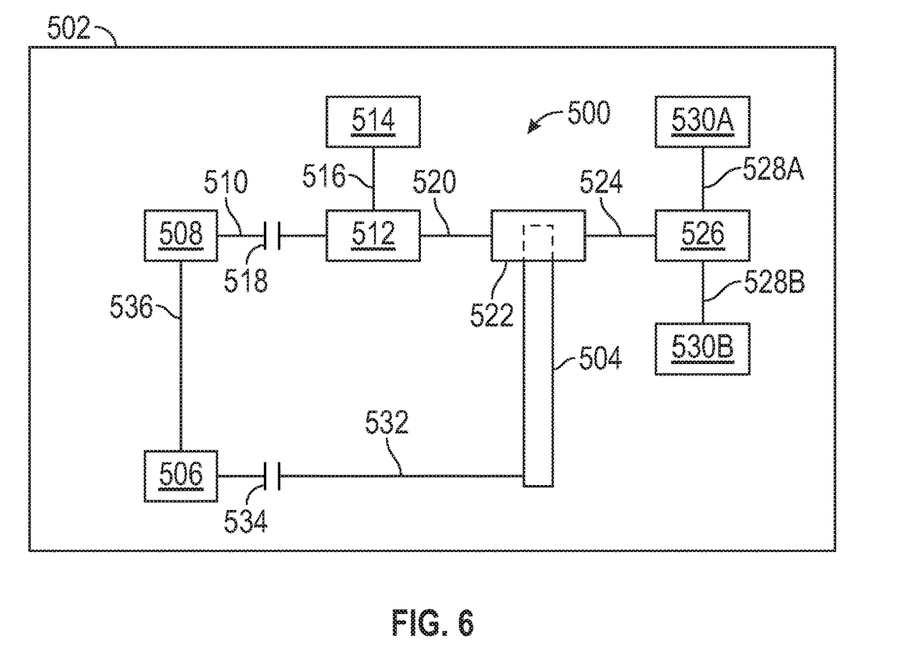
FIG. 6 is a fifth hybrid electric powertrain without a FEAD and having the mechanically driven supercharger.

Referring now to FIG. 6, there is schematically illustrated a fifth hybrid electric powertrain, indicated generally at 500, having a mechanical connection 504. Because the powertrain 500 and the mechanical connection 504 are variations of the powertrain 100 and mechanical connection 104 of FIGS. 1 and 2, like reference numerals, increased by 400, designate corresponding parts in the drawings and detailed description thereof will be omitted.

A mechanical connection 504 receives a supercharger torque from a transmission 522. As a non-limiting example, the mechanical connection 504 may receive the supercharger torque from a gearing of the transmission 522.

Figure 7:
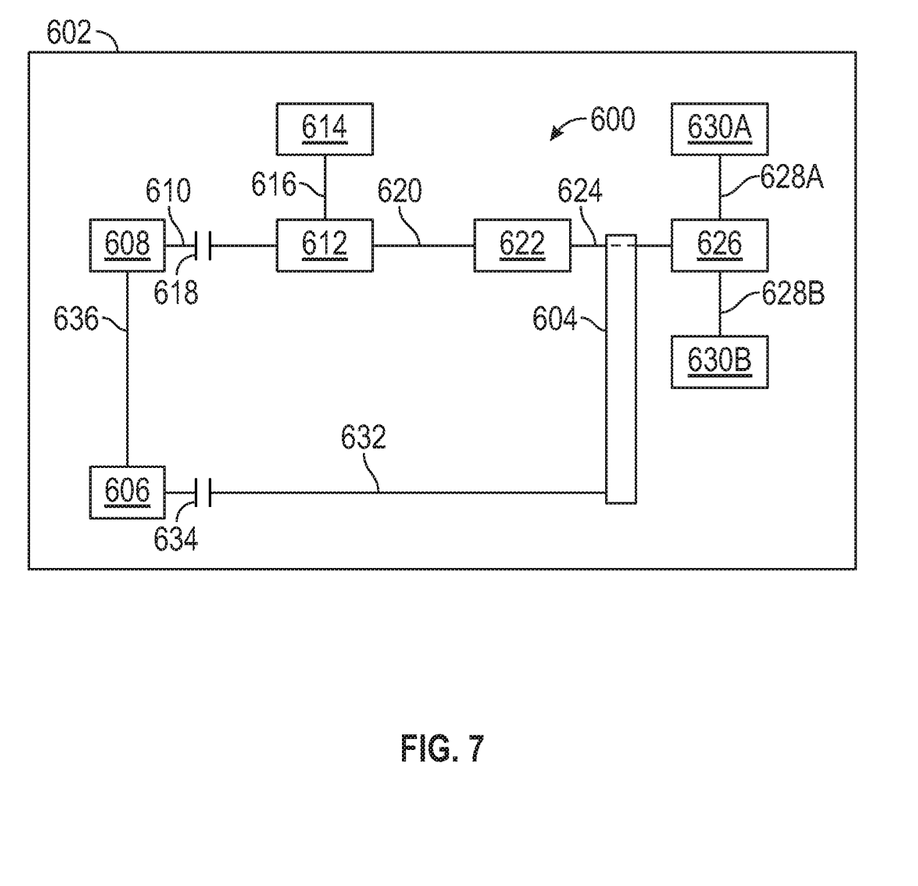
FIG. 7 is a sixth hybrid electric powertrain without a FEAD and having the mechanically driven supercharger.

Referring now to FIG. 7, there is schematically illustrated a sixth hybrid electric powertrain, indicated generally at 600, having a mechanical connection 604. Because the powertrain 600 and the mechanical connection 604 are variations of the powertrain 100 and mechanical connection 104 of FIGS. 1 and 2, like reference numerals, increased by 500, designate corresponding parts in the drawings and detailed description thereof will be omitted.

A mechanical connection 604 is connected to a third shaft 624 (shown by hidden lines). As a result, the mechanical connection 604 receives a supercharger torque from the third shaft 624 between a transmission 622 and a differential 626.

While certain embodiments of the present invention have been described in detail, those familiar with the art to which this invention relates will recognize various alternative designs and embodiments for practicing the invention as defined by the following claims.

What is claimed is:

1. A hybrid vehicle comprising:
   an engine configured to rotate driven wheels of the vehicle;
   a motor on a common shaft with the engine and configured to also rotate the driven wheels, wherein the common shaft is powered by at least one of the engine and motor;
   a supercharger configured to provide forced induction to the engine;
   a mechanical connection configured to transfer torque from the common shaft to the supercharger, wherein the supercharger is a single torque load on the mechanical connection;
   a first clutch between the engine and motor;
   a second clutch between the motor and supercharger.

2. The hybrid vehicle of claim 1 wherein the first clutch is also between the engine and mechanical connection.

3. The hybrid vehicle of claim 1 wherein the second clutch is also between the mechanical connection and supercharger.

4. The hybrid vehicle of claim 1 wherein the first and second clutches are both open and the vehicle is configured for the motor only to rotate the driven wheels.

5. The hybrid vehicle of claim 1 wherein the first and second clutches are both closed and the vehicle is configured for the engine to operate with the forced induction provided by the supercharger and the supercharger is configured to be powered by both the engine and motor.

6. The hybrid vehicle of claim 1 wherein the first clutch is closed and the second clutch is open and the vehicle is configured for the engine to operate without the forced induction provided by the supercharger.

7. The hybrid vehicle of claim 1 wherein the first clutch is open and the second clutch is closed and the supercharger is configured to be powered by the motor only.

8. The hybrid vehicle of claim 1 wherein the first clutch is open and the second clutch is closed and the supercharger is configured to start the engine using positive intake pressure.

\* \* \* \* \*